United States Patent [19]

Bownass et al.

[11] Patent Number: 4,515,184
[45] Date of Patent: May 7, 1985

[54] MODULAR DIRECTIONAL VALVE

[75] Inventors: Norris Bownass, Burgess Hills; Donald J. Clarkson, Wokingham, both of England

[73] Assignee: Abex Corporation, Stamford, Conn.

[21] Appl. No.: 514,741

[22] Filed: Jul. 18, 1983

[51] Int. Cl.³ ............................................ F16K 27/04
[52] U.S. Cl. ............................. 137/625.66; 137/556; 137/625.69; 251/367
[58] Field of Search ..................... 137/270, 270.5, 271, 137/625.65, 625.66, 625.69, 884; 251/367

[56] References Cited

U.S. PATENT DOCUMENTS

| | | | |
|---|---|---|---|
| 3,324,885 | 6/1967 | Beech | 251/367 X |
| 3,559,687 | 2/1971 | Aslan | 137/625.69 |
| 4,084,618 | 4/1978 | Gurries | 137/625.69 X |

Primary Examiner—Robert G. Nilson
Attorney, Agent, or Firm—Mueller and Smith

[57] ABSTRACT

A multi-port directional valve and subplate for mounting the valve in which the valve body comprises a housing having a plurality of parallel, laterally spaced slots formed in its inner surface; a plurality of individual port modules each having a pair of parallel side walls, a bottom surface, a spool bore, a longitudinal port bore which connects the bottom surface and the spool bore, an outer surface, and a rib formed on the outer surface such that the outer surface of each module is complementary with the inner surface of the housing; a spool which changes the operating position of the valve and a pair of actuator housings each connected to one end of the cover housing and mounted on the subplate; and the valve body is mounted on the subplate to align the module ports with ports in the subplate.

10 Claims, 4 Drawing Figures

MODULAR DIRECTIONAL VALVE

BACKGROUND OF THE INVENTION

This invention relates to a modular, spool-operated, directional valve. More particularly, it relates to the construction and assembly of the modules comprising the valve body and the mounting of the valve body on a subplate.

A valve body constructed from a plurality of identical modules may be assembled by means of bolts as shown in U.S. Pat. No. 3,915,194, which is assigned to the assignee of the instant invention. In the structure disclosed in that patent, a plurality of identical valve block modules are assembled by having alternate blocks inverted or rotated such that opposite faces are mated and a pair of bolts pass through one module and thread into an adjacent module to form a manifold assembly. This assembly is then bolted to a subplate. Valve block modules can also be assembled by tie bolts which pass through a plurality of valve modules and clamp them together. An example of the use of tie bolts is shown in U.S. Pat. No. 3,504,704.

Most modular valve body assemblies are mounted on a subplate which provides porting for fluid supplied to and received from the modular valve body. Typically, each module of the valve assembly is connected to the subplate by means of fasteners, such as bolts, which pass through the module. This means that each module must be large enough to provide space for fasteners which connect the module to the subplate as well as for the fasteners which interconnect the modules.

A disadvantage to a modular valve construction in which bolts are used to interconnect adjacent valve modules and to connect the modules to a subplate is that the fasteners take up considerable space and cause the valve structure to be enlarged. For a given size of valve this reduces the size of the ports and bores which can be used in the valve and reduces the capacity of the valve. The use of such fasteners also increases the complexity and cost of manufacturing the valve. Additionally, if one valve module has to be changed, the entire modular assembly must be disassembled.

It is desirable to provide a compact modular valve in which a plurality of individual modules can be assembled to provide a modular valve body without having fasteners pass through the bodies of adjacent modules, and in which the valve body is mounted on a subplate to form a modular valve without having fasteners pass through the bodies of the modules to attach the modules to the subplate.

SUMMARY OF THE INVENTION

The instant invention provides a modular, multi-port, spool-operated directional valve and a subplate for mounting the valve characterized by the valve comprising a cover housing having a plurality of parallel, laterally spaced slots formed in its inner surface; a plurality of individual port modules each having a pair of parallel side walls, a bottom surface, a lateral spool bore which opens into each side wall, a longitudinal port bore one end of which opens into the spool bore and the other end opens into the bottom surface of the module, an outer surface and a rib formed on the outer surface such that the outer surface of the module is complementary with the inner surface of the cover housing and the module rib is adapted to be received in a cover housing slot; a plurality of spool seals each adapted to be inserted between adjacent port modules and surround the spool bores; a longitudinally extending spool which is inserted through the spool bores, wherein movement of the spool causes the operating position of the valve to change; and a pair of actuator housings each connected to one end of the cover housing and mounted on the subplate. Additionally, a subplate is provided having ports which receive the port modules such that each subplate port is aligned with the port bore of a port module to enable the subplate port to supply pressure fluid to the modules and receive fluid therefrom.

DESCRIPTION OF THE PREFERRED EMBODIMENT

Figure 1:
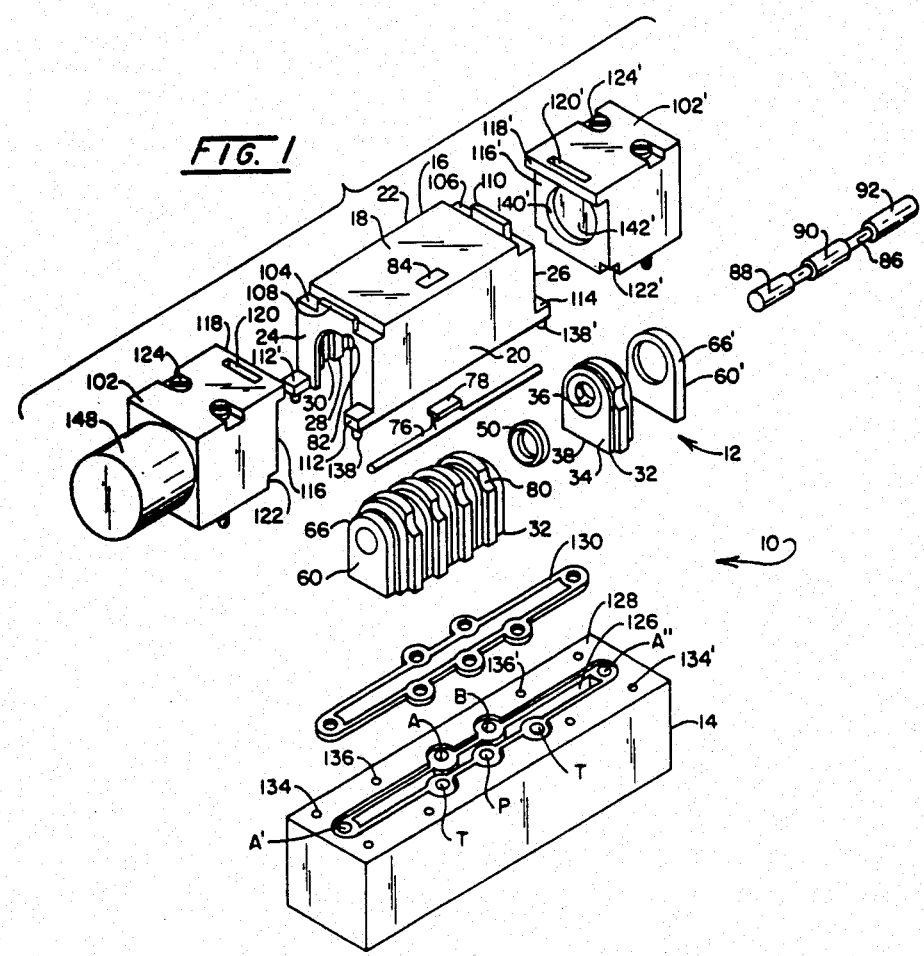
FIG. 1 is an exploded view of the modular valve of the instant invention.

Referring to FIGS. 1-4, the modular directional valve 10 of the instant invention comprises a modular valve body 12 mounted on a subplate 14. Modular body 12 includes a cover housing 16 defined by a top wall 18 having a smooth, flat outer surface, front and rear side walls 20, 22 respectively, and a pair of end walls 24, 26. The inner surface 28 of cover housing 16 which is defined by top wall 18 and front and rear side walls 20, 22 is generally U-shaped and includes a plurality of equally spaced lateral slots 30.

Figure 4:
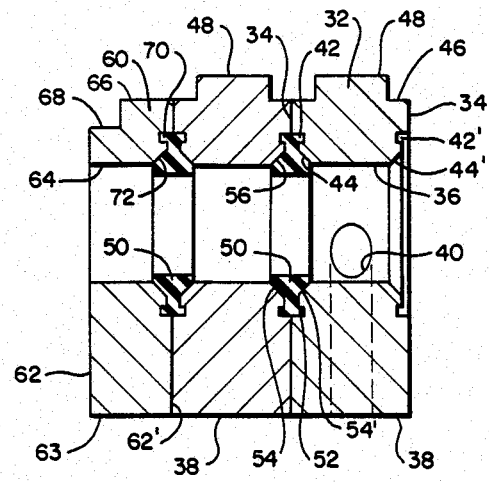
FIG. 4 is a sectional view of two port modules nd an end cap.

Valve body 12 also includes a plurality of port modules 32. Each module 32 has a pair of parallel side walls 34, 34', a lateral spool bore 36 which opens into each side wall, a flat bottom surface 38 and a longitudinal port bore 40 which opens into spool bore 36 and flat bottom surface 38. Note, in this description identical elements are indicated by identical primed numbers. A circular groove 42, 42' which is concentric with and surrounds spool bore 36 is formed in each of the side walls 34, 34', respectively, as shown in FIG. 4. A tapered surface 44, 44' is formed between the grooves 42, 42', respectively, and spool bore 36. The outer surface 46 of each port module 32 located between the side walls 34, 34' is generally U-shaped, has a central rib 48 formed thereon and is complementary with the inner surface 28 of cover housing 16.

A generally ring-shaped seal 50 having an outer rim 52, angled side walls 54, 54' and an inner wall 56 defining a spool receiving bore is adapted to be inserted between two adjacent port modules 32 to prevent leakage therebetween. One half of seal 50 is received in each of two adjacent port modules 32, 32 with rim 52 received in adjacent grooves 42, 42' and angled side walls 54, 54' received in tapered surfaces 44, 44' formed in module side walls 34, 34'.

In addition to port modules 32, valve body 12 also includes an end cap 60 located at each end of an assembly of port modules 32. Each end cap 60 has a pair of generally flat, parallel side walls 62, 62', a spool bore 64, a generally U-shaped outer surface 66, a groove 68 in outer surface 66 adjacent side wall 62, such that the outer surface 66 is complementary with the inner surface 28 of cover housing 16 at each end of the module assembly. In addition, each end cap 60 has a circular groove 70 which surrounds spool bore 64 and a tapered surface 72 between groove 70 and spool bore 64. Groove 70 and surface 72 are identical to grooves 42, 42' and surfaces 44, 44', respectively, in module 32. Groove 70 and tapered surface 72 receive one half of a seal 50 positioned between an end cap 60 and an adjacent port module 32 in the same manner as a seal 50 is received between two adjacent port modules 32, 32'.

Figure 2:
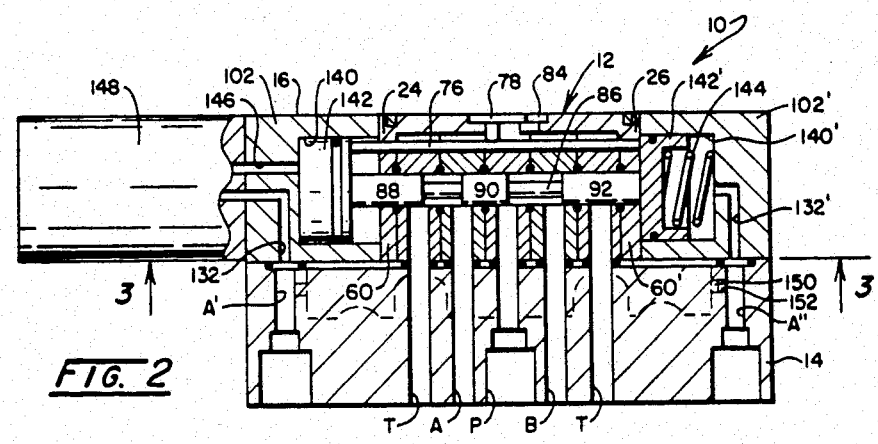
FIG. 2 is a longitudinal sectional view of the valve of FIG. 1 showing porting and operation of the valve and indicator mechanism.
Figure 3:
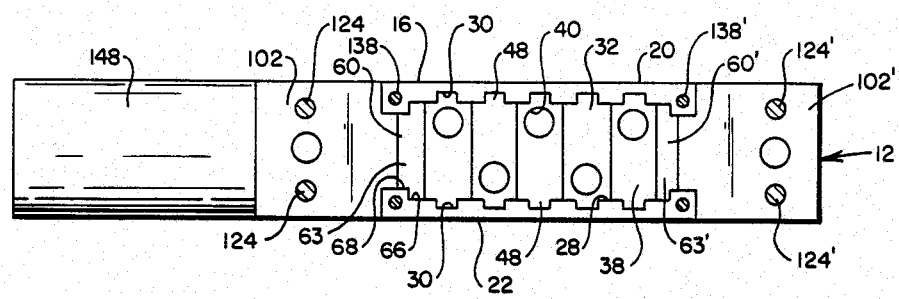
FIG. 3 is a bottom view of the valve taken along lines 33 of FIG. 2.

Modular valve body 12 also contains a mechanism which indicates the operating position of the directional valve 10. The indicating mechanism includes a longitudinally extending, circular rod 76 and an indicator 78 mounted centrally thereof. Referring to FIGS. 1 and 2, it can be seen that the central rib 48 of each port module 32 contains a semi-circular cut-out 80 and that the inner surface 28 of cover housing 16 contains a similar semi-circular cut-out 82 opposite that of the rib cut-out 80. A window 84 is cut out of the top wall 14 of cover housing 16 to receive indicator 78, as will be described hereinafter. Valve body 12 also contains a spool 86 which is received in spool bore 36 in each port module 32, in spool bore 64 of each end cap 60 and in the inner surface 56 of each seal 50. Spool 86 has three control lands 88, 90, 92 and is the same length as indicator rod 76.

Assembly of the port modules 32, end caps 60, seals 50, indicator mechanism 76, 78 and spool 86 will now be described. The five port modules 32 which can be rotated 180° about their longitudinal axis to change the orientation of port bores 40 with respect to subplate 14 and will receive pressure fluid from port P in subplate 14, deliver pressure fluid to one of the ports A or B and connect the other port A or B to one of the tank ports T T' in subplate 14 are oriented such that when the valve body 12 engages subplate 14 each port bore 40 in a module is connected with a port bore in subplate 14. A seal 50 is inserted between each adjacent port module 32 or port module 32 and end cap 60. Indicator rod 76 is then placed in the semi-circular cut-out 82 in cover housing 16 so that indicator 78 appears in window 84. Subsequently, the port modules 32 and end caps 60 are squeezed together and inserted into cover housing 16 such that the center ribs 48 on the port modules 32 engage the appropriate slots 30 in the housing 16. When the port modules 32 and end caps 60 are properly positioned in cover housing 16 the bottom surfaces 38 of the port modules 32 and the bottom surfaces 63 of the end caps 60 provide a smooth, flat bottom surface for the modular valve body 12. Spool 86 is then pushed through the spool bores 36, 64 in the modules 32 and end caps 60 and through the seals 50 to complete the assembly of modular valve body 12.

A pair of spool actuator housings 102, 102' are attached to each end of the modular valve body 12. A portion 104, 106 of each end wall 24, 26, respectively, of cover housing 16 is cut away to provide a centrally located tongue 108, 110, respectively, adjacent each end of top wall 18. A pair of laterally projecting lugs 112, 112' are formed at the bottom edge of end wall 24 and a similar pair of laterally projecting lugs 114, are formed at the bottom edge of end wall 26. Each actuator housing 102, 102' has a side wall 116, 116' which complements the end walls 24, 26 of cover housing 16. A lip 118, 118' projects laterally from the top of each side wall 116, 116' and is received in the cut out portions 104, 106 of the end walls 24, 26. Slots 120, 120' are formed in the lips 118, 118', respectively, to receive tongues 108, 110. Additionally, grooves 122, 122' are formed in bottom of the actuator housing side walls 116, 116' to receive the lugs 112, 112', 114, which project from the end walls 24, 26. A pair of vertical bores are formed in each actuator housing 102, 102'. Bolts 124, 124' are inserted in each of the vertical bores to provide a means for rigidly attaching modular valve body 12 and actuator housings 102, 102' to subplate 14.

The function of subplate 14 is to provide a means for connecting valve body 12 to a source of fluid pressure, to tank ports and to the device which is controlled by operation of valve body 12. Referring to FIGS. 1 and 2, subplate 14 includes five vertical bores or ports P, T, T', A, B, which are positioned centrally within subplate 14 and which are laterally offset from each other by the same amount. P designates a pressure port, T, T' designate exhaust ports and A and B designate ports connected to a device, not shown, controlled by directional valve 10. A central, longitudinally extending groove 126 is formed in subplate 14 and opens into the top surface 128 thereof. Groove 126 is connected to pressure port P and opens into a pair of ports A', A'' located at each end of subplate 14. The function of groove 126 and ports A' and A'' is to provide a source of pressure fluid for use by one or both actuators, to be described hereinafter, positioned in the actuator housings 102, 102'.

Valve body 12 is mounted on subplate 14 as follows. A diaphragm, seal or gasket 130 is placed on subplate 14 such that it completely covers central passage 126 and provides a seal around each of the ports P, T, T', A, B, A', A'' in subplate 14. Valve body 12 is mounted on gasket 130 such that the longitudinal port bore 40 in each port module 32 is aligned with one of the five centrally located subplate ports P, T, T', A, B. In a similar manner, port bores 132, 132' in actuator housings 102, 102', respectively, are aligned with subplate ports A', A''. Subplate 14 has two pairs of threaded bores 134, 134' which are aligned with the vertical bores in actuator housings 102, 102' and receive the pairs of bolts 124, 124' therein to thereby secure the actuator housings 102, 102' and the valve body 12 to subplate 14. Subplate 14 also contains pairs of bores 136, 136' which receive pairs of cylindrical locating pins 138, 138' formed on the bottom of the lugs 112, 112', 114 on valve body 12. It is apparent that port modules 32 in modular valve body 12 are held against gasket 130 and subplate 14 by means of the actuator housings 102, 102' which engage each end of the valve body 12 and are bolted to subplate 14. No fastener passes through any of the port modules 32 or the cover housing 16.

Referring to FIG. 2, each actuator housing 102, 102' has a central, longitudinal bore 140, 140', respectively, which receives a piston 142, 142', respectively. A spring 144' is positioned in bore 140' of actuator housing 102' and biases piston 144' to the left. Piston 144' engages one end of spool 86 and actuator rod 76 which project through end wall 26 of cover housing 16 and bias the spool and indicator rod leftward to one extreme position. As spool 86 and indicator rod 76 are moved to the left, they project through openings in end wall 24 of cover housing 16 and bias piston 142 in bore 140 of actuator housing 102 leftward until the piston 142 reaches the bottom of bore 140. Since spool 86 and rod 76 are the same length, they move together through the same distance. In this position of spool 86, pressure port P is connected to port B between lands 90, 92 and port A is opened to exhaust T between lands 88 and 90. Also, indicator 78 is in the leftmost portion of window 84 to indicate the operating position of the valve 10. A plug 150 is inserted in a bore 152 to block air pressure to subplate port A″ is mechanically actuated by spring 144′ in this embodiment.

A solenoid operated valve sets the positon of piston 142 as will now be described. Central passage 126 which is connected to pressure port P is connected to port A′ which, in turn, is connected to port 132 in actuator housing 102, as described above. Pressure fluid in port 132 is connected to a fluid passage 146 which opens into the bottom of bore 140 through a solenoid-operated valve 148. In order to shift spool 86 to change the operating position of directional valve 10, current is supplied to solenoid-operated valve 148 to open fluid passage 146 to pressure fluid in port 132. Pressure fluid in passage 146 overcomes the force of spring 144′ and biases piston 142 to the right. As spool 86 is moved to the right, indicator rod 76 also moves to the right from its leftmost position shown in FIG. 2. After spool 86 and indicator rod 76 are moved to the right to the second extreme position, pressure port P is connected to port A between lands 88 and 90 and port B is opened to exhaust T′ between lands 90, 92. The operating position of directional valve 10 can be seen by looking at the position of indicator 78 through window 84 in cover housing 16. Symbols placed on the top wall 18 of cover housing 16 show the direction of operation of valve 10 when indicator 78 is in either the rightmost or leftmost position. Although in the instant invention a spring 144′ was shown acting on piston 142′, a solenoid operated valve could be used to supply pressure fluid to piston 142′ as is done in actuator housing 102. Of course, a spring could also be used in bore 140 of housing 102 as in housing 102′.

From the above it can be seen that the instant invention provides a modular valve body having a plurality of port modules which are clamped together in a housing without fasteners which pass through the body of each module and that the valve body containing the modules is attached to a subplate without fasteners which pass through the body of each module to attach the module to the subplate.

Although a preferred embodiment of the invention has been illustrated and described, it will be apparent to those skilled in the art that various modifications may be made without departing from the spirit and scope of the present invention.

What is claimed is:

1. A multi-port, spool type, directional valve and a subplate for mounting the valve, characterized by the valve comprising a cover housing having a plurality of parallel, laterally spaced slots formed in its inner surface; a plurality of individual port modules each having a pair of parallel side walls, a bottom surface, a lateral spool bore which opens into each side wall, a longitudinal port bore one end of which opens into the spool bore and the other end opens into the bottom surface of the module, an outer surface, and a rib formed on the outer surface of each module such that the outer surface of a module is complementary with the inner surface of the cover housing and the module rib is received in a cover housing slot; a plurality of spool seals each adapted to be inserted between adjacent port modules and to surround the spool bores; a longitudinally extending spool inserted through the spool bores, wherein movement of the spool causes the operating position of the valve to change; and a pair of actuator housings each connected to one end of the cover housing and mounted on the subplate; and the valve body mounted on the subplate such that each subplate port is aligned with the port bore of a port module to enable the subplate ports to supply pressure fluid to the modules and receive fluid therefrom.

2. The directional valve of claim 1, further characterized by seal means interposed between the valve and subplate, means for fastening the actuator housings to the subplate and the connections between the actuator housings and the cover housing bias the cover housing and port modules toward and retain the cover housing and port modules in contact with the seal means.

3. The directional valve of claim 1, further characterized by a piston bore in each actuator housing, a piston in each piston bore, one end of the spool projects into a piston bore and force applied to the actuator piston causes the piston to engage one end of the spool and move the spool in the spool bore to shift the operating piston of the valve.

4. The directional valve of claim 2, further characterized by an indicator mounted in the cover housing which includes means for displaying the operating position of the valve; in one operating position of the valve one end of the spool projects into one of the actuator housings, one end of the indicator projects into one of the actuator housings, a piston in the one actuator housing simultaneously engages one end of the spool and one end of the indicator, and force applied to the actuator piston causes the piston to simultaneously move the spool in the module spool bores to change the operating position of the valve and move the indicator to display the changed operating position of the valve.

5. The directional valve of claim 4, further characterized by the indicator mounted in a plurality of bores partially formed in the port modules and partially formed in the cover housing which are parallel to the module spool bores such that the indicator moves parallel to and the same distance as the spool.

6. The directional valve of claim 5, further characterized by an opening in the cover housing which provides a view of the indicator display means.

7. The directional valve of claim 1, further characterized by a longitudinal fluid chamber separated from the subplate ports formed in the subplate, which chamber opens into the surface of the subplate that receives the cover housing; the fluid chamber is connected to a subplate port which supplies pressure fluid to a module port; a seal interposed between the valve and the subplate, the fluid chamber is covered by the seal to define a sealed fluid chamber; and the fluid chamber is connected to an actuator housing to provide a source of pressure fluid thereto.

8. The directional valve of claim 1, further characterized by the individual port modules having a symmetrical outer surface; the longitudinal port bores in the port modules are offset from the longitudinal axis of the modules; and the port modules can be inverted to enable a module port bore to align with subplate ports in either of two positions on the subplate.

9. The directional valve of claim 1, further characterized by a groove formed in each port module side wall which surrounds the spool bore and one half of a spool seal is received in a groove in one port module and the other half of the spool seal is received in a groove in an adjacent port module when the one and adjacent port modules are inserted in the cover housing.

10. The directional valve of claim 9, further characterized by a pair of end caps each having a pair of side walls, a lateral spool bore which opens into each side wall, a generally U-shaped outer surface, the outer surface of each end cap is complementary with the inner surface at each end of the cover housing, and a groove formed in one end cap side wall which surrounds the spool bore and one half of a spool seal is received in a groove in a port module and the other half of the spool seal is received in a groove of an adjacent end cap when the module and the adjacent end cap are inserted in the cover housing.

* * * * *